(12) United States Patent
Alexiades (10) Patent No.: US 10,817,573 B2
(45) Date of Patent: Oct. 27, 2020

(54) METHOD AND SYSTEM FOR GENERATING AND INCORPORATING A SIGNATURE IN A DOCUMENT

(71) Applicant: Nikitas Allan Alexiades, New York, NY (US)

(72) Inventor: Nikitas Allan Alexiades, New York, NY (US)

( * ) Notice: Subject to any disclaimer, the term of this patent is extended or adjusted under 35 U.S.C. 154(b) by 0 days.

(21) Appl. No.: 16/819,136

(22) Filed: Mar. 15, 2020

(65) Prior Publication Data

US 2020/0301979 A1 Sep. 24, 2020

Related U.S. Application Data

(60) Provisional application No. 62/820,996, filed on Mar. 20, 2019.

(51) Int. Cl.

| | |
|---|---|
| *G06F 17/00* | (2019.01) |
| *G06F 16/93* | (2019.01) |
| *G06K 9/00* | (2006.01) |
| *G06F 40/166* | (2020.01) |
| *H04L 29/06* | (2006.01) |

(52) U.S. Cl.
CPC ............ *G06F 16/93* (2019.01); *G06F 40/166* (2020.01); *G06K 9/00161* (2013.01); *H04L 63/0861* (2013.01)

(58) Field of Classification Search
CPC ....................................................... G06F 16/93
See application file for complete search history.

(56) References Cited

U.S. PATENT DOCUMENTS

| | | | | |
|---|---|---|---|---|
| 6,553,494 | B1 * | 4/2003 | Glass | G06F 21/32 713/176 |
| 2010/0235727 | A1 * | 9/2010 | Ashton | G06Q 10/10 715/253 |
| 2012/0284602 | A1 * | 11/2012 | Seed | G06Q 20/3825 715/224 |
| 2015/0010216 | A1 * | 1/2015 | Papastefanou | G06K 9/00154 382/120 |
| 2015/0095352 | A1 * | 4/2015 | Lacey | H04W 4/029 707/752 |

(Continued)

OTHER PUBLICATIONS

Wikipedia QR Code, retrieved from https://en.wikipedia.org/wiki/QR_Code, 22 pages, archived Mar. 15, 2019.*

*Primary Examiner* — Scott T Baderman
*Assistant Examiner* — Barbara M Level
(74) *Attorney, Agent, or Firm* — Andrew Morabito (57) ABSTRACT

The present invention is a computer implemented method comprising; receiving, by at least one processor, a request to sign a document, authenticating, by one or more processors, a user account, generating, by one or more processors, a coded signature, wherein the coded signature includes a set of data and the set of data is specific to the document and the user account, embedding, by one or more processors, the coded signature in the document, capturing, by one or more processors, an image of the image of signed document, and wherein a verification is requested of a signature, further comprising, analyzing, by one or more processors, the Coded Signature data and the document data to determine if the similarity of the data is within the predetermined tolerance.

14 Claims, 6 Drawing Sheets

(56) References Cited

U.S. PATENT DOCUMENTS

2015/0295922 A1\* 10/2015 Dunn .................. H04L 63/0861
　　　　　　　　　　　　　　　　　713/178
2017/0344732 A1\* 11/2017 Kohli ................. G06Q 20/2295
2017/0364911 A1\* 12/2017 Landrok ................ G06Q 20/42

\* cited by examiner

METHOD AND SYSTEM FOR GENERATING AND INCORPORATING A SIGNATURE IN A DOCUMENT

CROSS-REFERENCE TO RELATED APPLICATIONS

This application is a continuation-in-part (and claims the benefit of priority under 35 USC 120) of U.S. provisional application No. 62/820,996 filed Mar. 20, 2019. The disclosure of the prior applications is considered part of (and is incorporated by reference in) the disclosure of this application.

BACKGROUND

This disclosure relates generally to signature verification, and more specifically to a biometric signature verification and generation of an anti-counterfeit two-dimension code.

Paper documents with a penned signature are given much consideration as proof that an individual created, viewed, approved, or agreed to the material contained in the document. Specifically, the act of signing a document binds an individual to the document in some manner. For example, parties signify their agreement to the terms of a contract when the contract is signed. Often, a Notary Public is present in order to guarantee the identity of the individual(s) signing the document. The Notary Public attests to the identity of the signers by applying an unalterable seal to the document. It is desirable to implement a similar process for electronic documents; that is, to perform some processing on an electronic document that binds an individual to a particular document in such a manner that the individual can be identified, the document can be verified, and that it is provable at any later point in time that the individual and document were coupled.

Current digital signature techniques that are used to bind an individual to an electronic document rely on a key or keys presumably known only to the signer or possessed only by the signer (e.g. keys stored on a smart card) of the document. Unfortunately, this approach is not as secure as it may appear, since if the knowledge or possession of the key can be obtained by another individual, either with or without the consent or knowledge of the original individual, then doubt may exist as to the true identity of the signer. So, a fundamental problem with acceptance of digital signatures is the fact that someone could compromise their integrity by repudiating their "signature." For example, a person could sign a document, and then claim that their secret key had been compromised, and thus introduce doubt as to the actual signer of the document. Thus, there is a need for a more secure method of performing digital signing. The incorporation of a highly robust biometric solves this problem, since the signing of the document is not performed with something that the individual knows or has, but rather something that the individual "is." Additionally, it would be significantly difficult to almost impossible for someone to duplicate the biometric portion of the signature. Robust biometric techniques such as iris identification, coupled with cryptographic techniques such as digital signatures may be employed to provide a secure solution. Such a system is described herein.

Algorithms such as hash functions have long been used as a means of authenticating that a given electronic document has not been altered. The output of a hash function operating on a block of data, such as an electronic document, is a smaller block of data that is characteristic of the input data such that given the same input data, reapplication of the same hash function will compute the same output. Thus, the hash reduces the dimensionality of the original document to one that is smaller but is a function of all the data in the original document. This data block can be thought of as the "digital fingerprint" of the input data. Any change in the input elements will result in a change of the output data block.

Additional security may be implemented by including a secret key in the process, for example, by encrypting the hash algorithm output with a cryptographic key. A hash which has been encrypted with a key, is commonly known as a "digital signature". The notable difference between a hash function and a digital signature is the inclusion of a "secret" in the latter; a hash algorithm may be well known (and even the token may be known). Therefore, anyone can compute a value for a given document, but with the addition of this "secret", only parties with knowledge of the key can perform signing and authentication.

Biometric verification is an additional security measure which can be incorporated into the signing of documents. The biometric identification relies on the fact that all humans are different in their physical characteristics, and therefore, it is possible to distinguish between any two people based on these differences. Hair color, height, and the sound of a voice are simple examples of how people are different from one another. Combined, these differences create our identity and make us distinct from each other.

In the context of software and data access control, biometrics may use one or more unique characteristics to identify a person or verify that a person is who they say they are. Biometrics work by matching or comparing a person's unique traits with stored data (the "biometric template" for the user) in two general categories: physiological characteristics and behavioral characteristics. Physical indicators include iris or retina patterns, fingerprint, facial structure, or hand geometry. Behavioral traits may include voiceprints, typing recognition (for example, the timing between keystrokes) and handwritten signatures.

While biometrics seem like a perfect addition to the verification process, they have one major drawback: the software that is used to manipulate biometric data is generally easy to compromise. For example, if an attacker can locate the line of software code which determines whether an input biometric matches the stored data, the attacker can modify this conditional branch to allow all access attempts to be successful.

Therefore, it is desired for a method, computer program, or computer system that incorporates the biometric verification along with the generation of a specific and custom two-dimensional code to accompany the signature with the document.

SUMMARY

In a first embodiment, the present invention is a computer implemented method comprising: receiving, by at least one processor, a request to sign a document; authenticating, by at least one processor, a user account; generating, by at least one processor, a coded signature, wherein the coded signature includes a set of data and the set of data is specific to the document and the user account; embedding, by at least one processor, the coded signature in the document; and creating, by at least one processor, a protected signed document.

In a second embodiment the present invention is a computer program product comprising: one or more non-transitory computer readable storage media and program instructions stored on the one or more computer readable storage media, the program instructions comprising: program instructions to receive a request to sign a document; program instructions to authenticate a user account associated with the document; program instructions to generate a coded signature, wherein the coded signature includes a set of data and the set of data is specific to the document and the user account; program instructions to embed the coded signature in the document; and program instructions to create a signed document, wherein the signed document is associated with the user account.

In a third embodiment the present invention is a computer system comprising: a computer non-transitory readable storage device readable by one or more processing circuit and storing instructions for execution by one or more processor for performing a method comprising: program instructions to receive a request to sign a document; program instructions to authenticate a user account associated with the document; program instructions to generate a coded signature, wherein the coded signature includes a set of data and the set of data is specific to the document and the user account; program instructions to embed the coded signature in the document; and program instructions to create a signed document, wherein the signed document is associated with the user account.

BRIEF DESCRIPTION OF THE DRAWINGS

Referring now to the drawings in which like reference numbers represent corresponding parts throughout.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The present invention generally relates to a system for verifying a user who is signing a document, processing the signature, and applying a variety of security features with the signature to greatly enhance the security of electronic signatures and provide a multi-point verification of the signature to determine if a forgery is attempted. This is advantageous as the current system for electronic signatures is easily forged, and nearly impossible to trace back to identify if a signature has been altered after the signing.

The benefits of the "Coded Signature" is that each signature will be unique to each document and no two signatures would be alike. All other platforms use verification to create a signature, but every signature is a signature template on a document. This present invention provides a code which is unique to the particular document based on biometric verification. The signature data is verifiable as the data is saved in the user database based on the user account.

The invention is able to fully verify the signature for documents. Signatures are used to identify the person signing. The invention is able to utilize the existing biometric verification system of smartphones/laptops (touchid, faceid, fingerprint scan) to verify the signer (e.g. user) and create a unique id for each signature. The "Coded Signature" contains a code that is combined with the signers actual signature thereby having the individuals signature as a first form of verification and the coded signature as a second form of verification, each providing valuable information in the event the signature needs to be verified for authenticity By creating a unique Coded Signature per document in conjunction with the signature, this prohibit forgeries as the same signature cannot be used on a separate document or replicated due to the data contained in the Coded Signature. The Coded Signature contains date, time, location, and various other pieces of information within the Coded Signature, that are specific and particular to that one signature only. The information contained in the Coded Signature would be verifiable via the user's account that contains all the corresponding information about the user, the documents they have signed, and the like. Access to the online account would be possible only by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
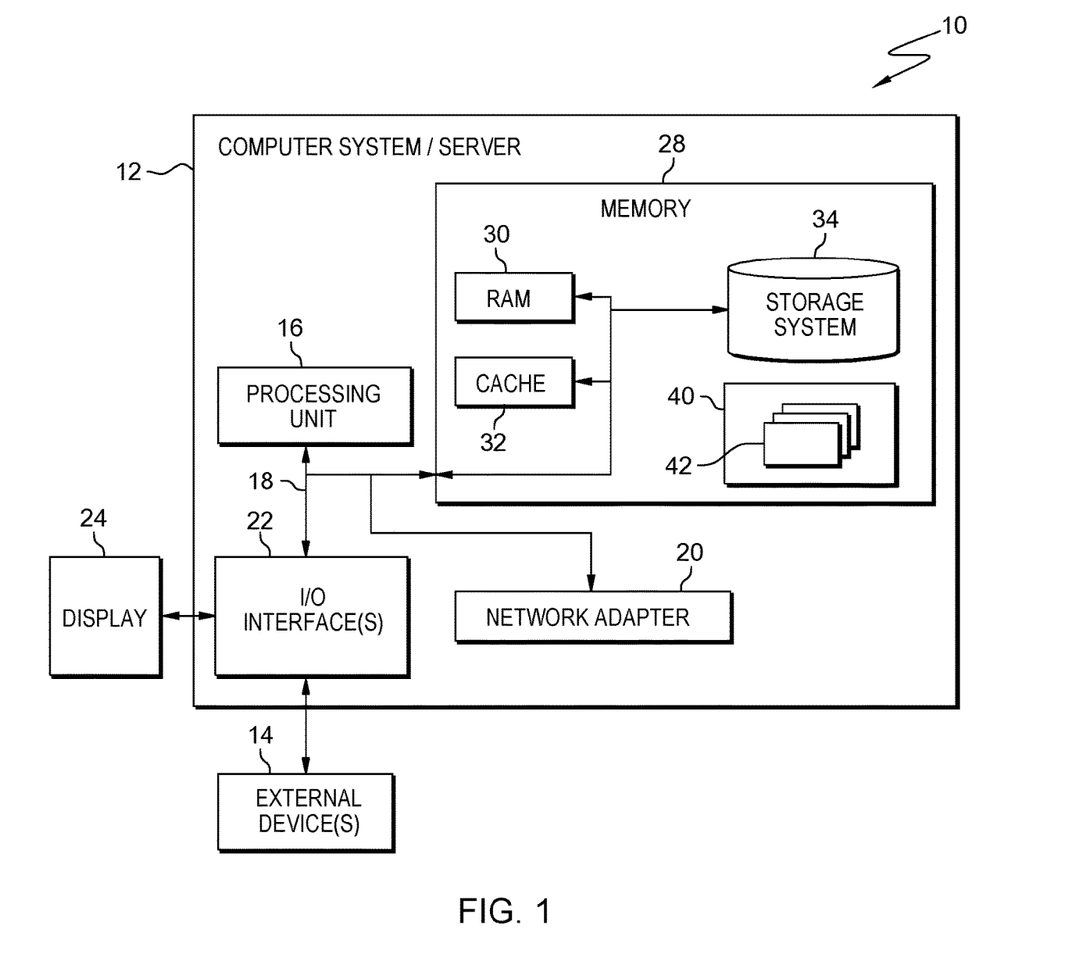
FIG. 1 depicts a cloud computing node, according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
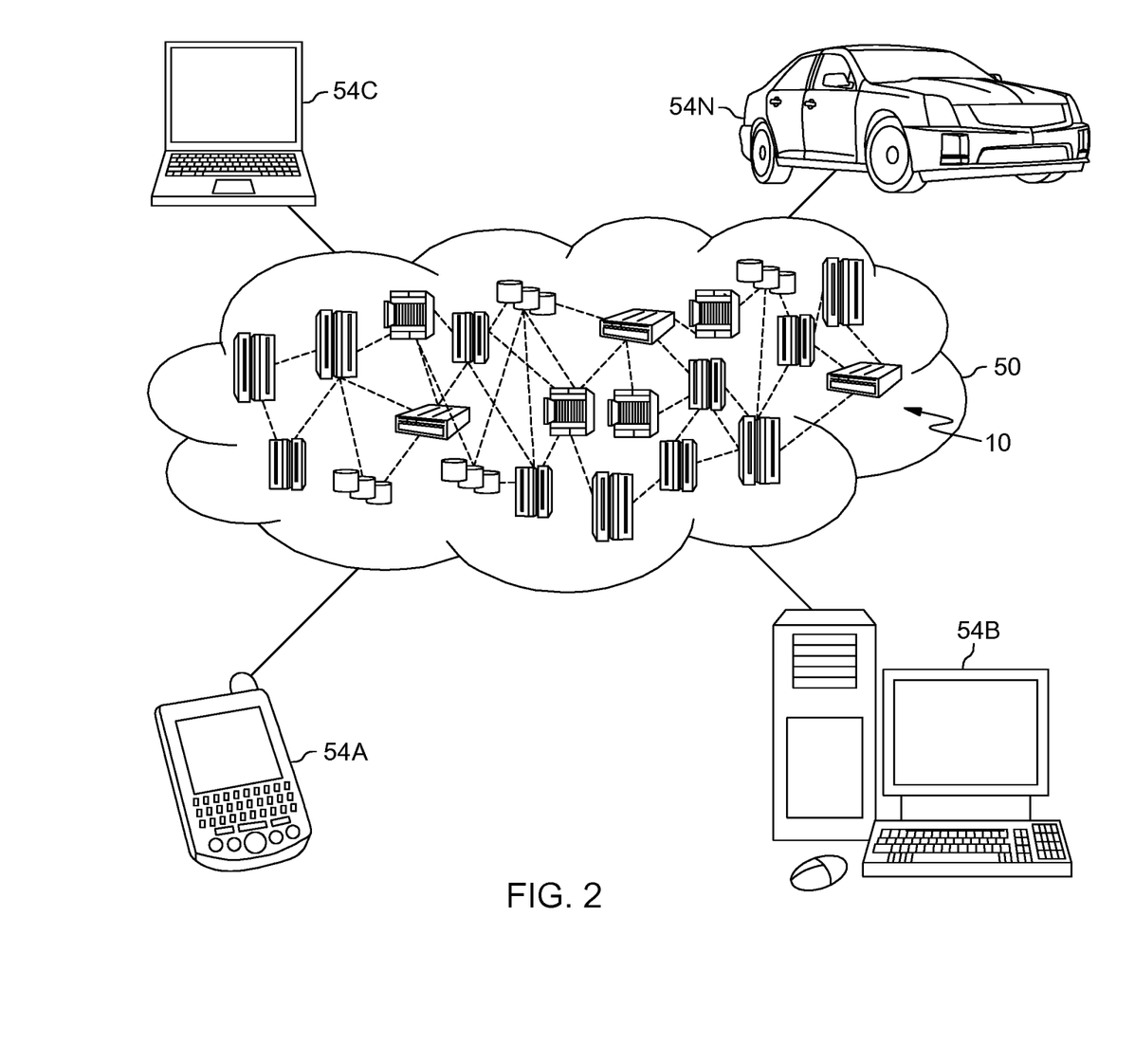
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
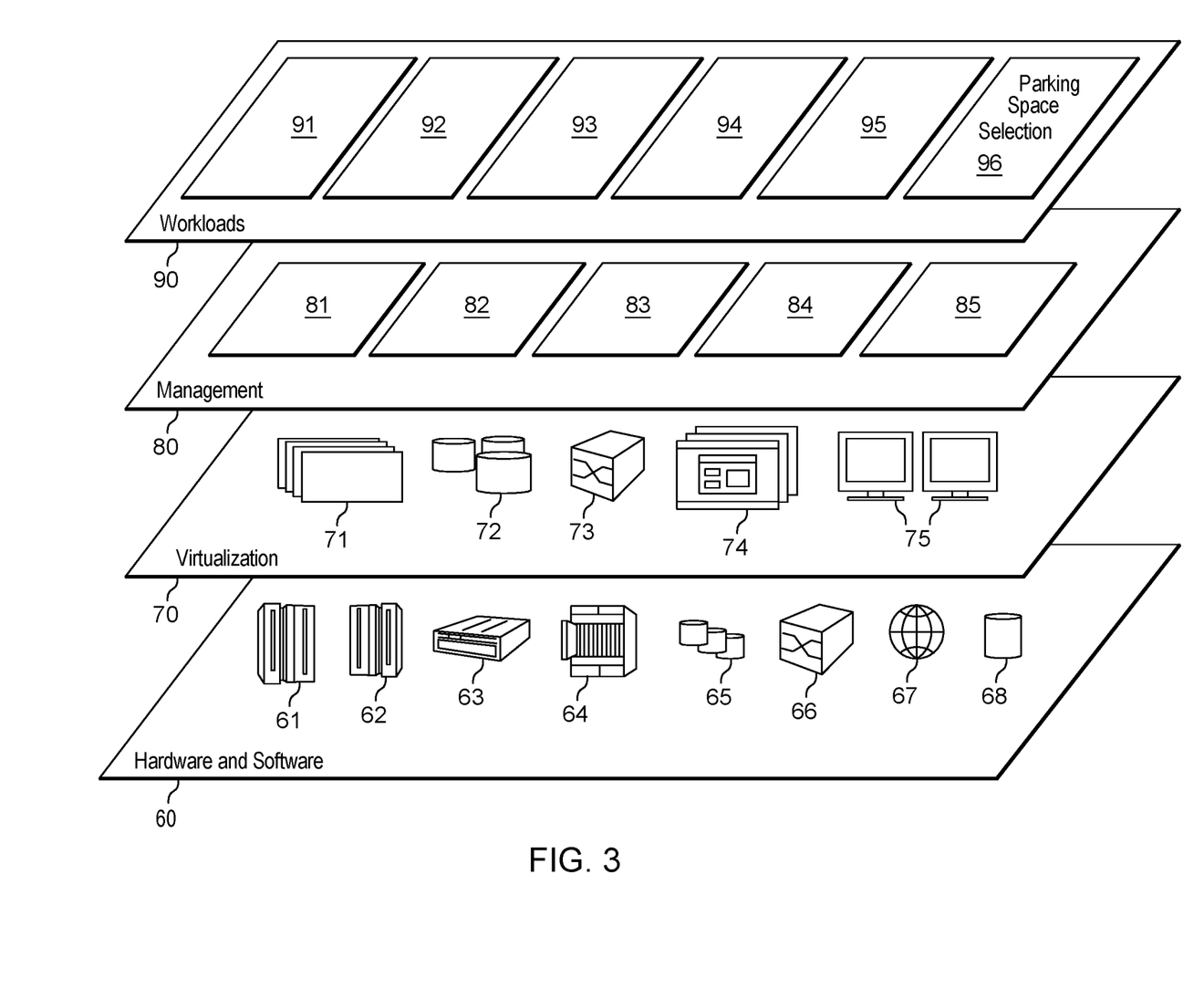
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking space selection 96.

Referring back to FIG. 1, the Program/utility 40 may include one or more program modules 42 that generally carry out the functions and/or methodologies of embodiments of the invention as described herein. Specifically, the program modules 42 receives a request to generate a signature for a document, receives confirmation from the user to generate the signature, creates the document specific signature and applies it to the document, and stores the signature information for reference. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a signature creation server as shown in FIG. 4.

Figure 4:
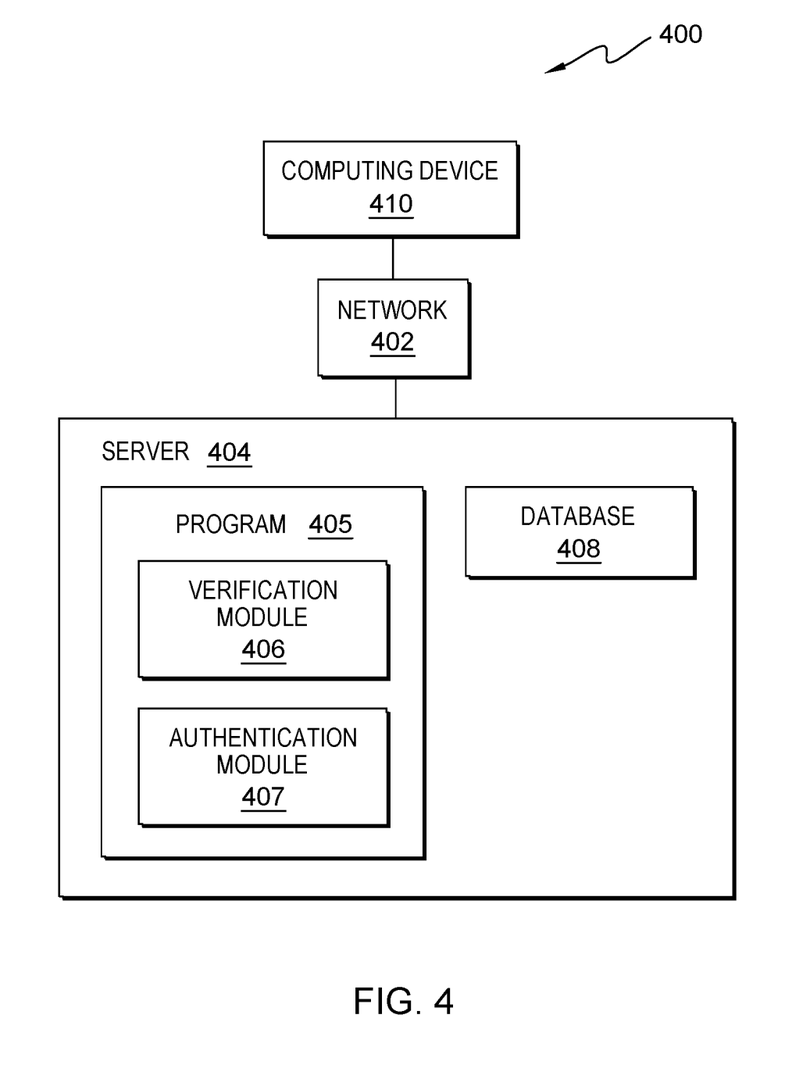
FIG. 4 depicts a block diagram depicting a computing environment, according to an embodiment of the present invention.

FIG. 4 depicts a block diagram of a computing environment 400 in accordance with one embodiment of the present invention. FIG. 1 provides an illustration of one embodiment and does not imply any limitations regarding the environment in which different embodiments maybe implemented.

In the depicted embodiment, computing environment 400 includes network 402, computing device 140, and server 404. Computing environment 400 may include additional servers, computers, or other devices not shown.

Network 402 may be a local area network (LAN), a wide area network (WAN) such as the Internet, any combination thereof, or any combination of connections and protocols that can support communications between computing device 410 and server 404 in accordance with embodiments of the invention. Network 102 may include wired, wireless, or fiber optic connections.

Computing device 410 may be a server, a web server, or any other electronic device or computing system capable of processing program instructions and receiving and sending data. The computing device 410 is able to process biometric data (e.g. touched, faceid, fingerprint scanner, etc.). In some embodiments, computing device 410 may be a laptop computer, tablet computer, netbook computer, personal computer (PC), a desktop computer, or any programmable electronic device capable of communicating with server 404 via network 402. In other embodiments, computing device 410 may represent a server computing system utilizing multiple computers as a server system, such as in a cloud computing environment. In another embodiment, computing device 410 represents a computing system utilizing clustered computers and components to act as a single pool of seamless resources.

Server 404 may be a program server, a web server, or any other electronic device or computing system capable of processing program instructions and receiving and sending data. In another embodiments server 404 may be a laptop computer, tablet computer, netbook computer, personal computer (PC), a desktop computer, or any programmable electronic device capable of communicating via network 402. In one embodiment, server 404 may be a server computing system utilizing multiple computers as a server system, such as in a cloud computing environment. In one embodiment, server 404 represents a computing system utilizing clustered computers and components to act as a single pool of seamless resources. In the depicted embodiment database 408 is located on server 404.

Verification module 406 provides for the generating the user account, receiving the user biometric data, processing the user account platform for receiving the biometric data, processing the signing of the document, generating the two signature code (e.g. two dimensional QR code or the like), and storing the data associated with the Signature Code and the biometric data. In the depicted embodiment, Verification module 406 utilizes network 402 to access the computing device 410 and communicates with database 408. In one embodiment, Verification module 406 resides on computing device 410. In other embodiments, Verification module 406 may be located on another server or computing device, provided Verification module 406 has access to authentication module 407 and database 408.

Authentication module 407 provides the verification process of the generated signatures. Through the capturing of the Coded Signature, the analyzing of the encrypted Coded Signature data, and comparing the data to the stored user information. The authentication module 407 is able to determine if the signature is a forgery or the original. In the depicted embodiment, authentication module 407 utilizes network 402 to access the computing device 410 and communicates with database 408. In one embodiment, authentication module 407 resides on computing device 410. In other embodiments, authentication module 407 may be located on another server or computing device, provided authentication module has access to verification module 406 and database 408.

Database 408 may be a repository that may be written to and/or read by verification module 406 and authentication module 407. Information associated with the user, the user account, the user's signature, the Coded Signatures, the data contained in the coded signature, the data extracted from the documents, the data scanned, and the like may be stored to database 408. Such information may include previous scores, audio files, textual breakdowns, facts, events, and contact information. In one embodiment, database 408 is a database verification system (DBMS) used to allow the definition, creation, querying, update, and administration of a database(s). In the depicted embodiment, database 408 resides on computing device 410. In other embodiments, database 408 resides on another server, or another computing device, provided that database 408 is accessible to verification module 406 and authentication module 407.

Figure 5:
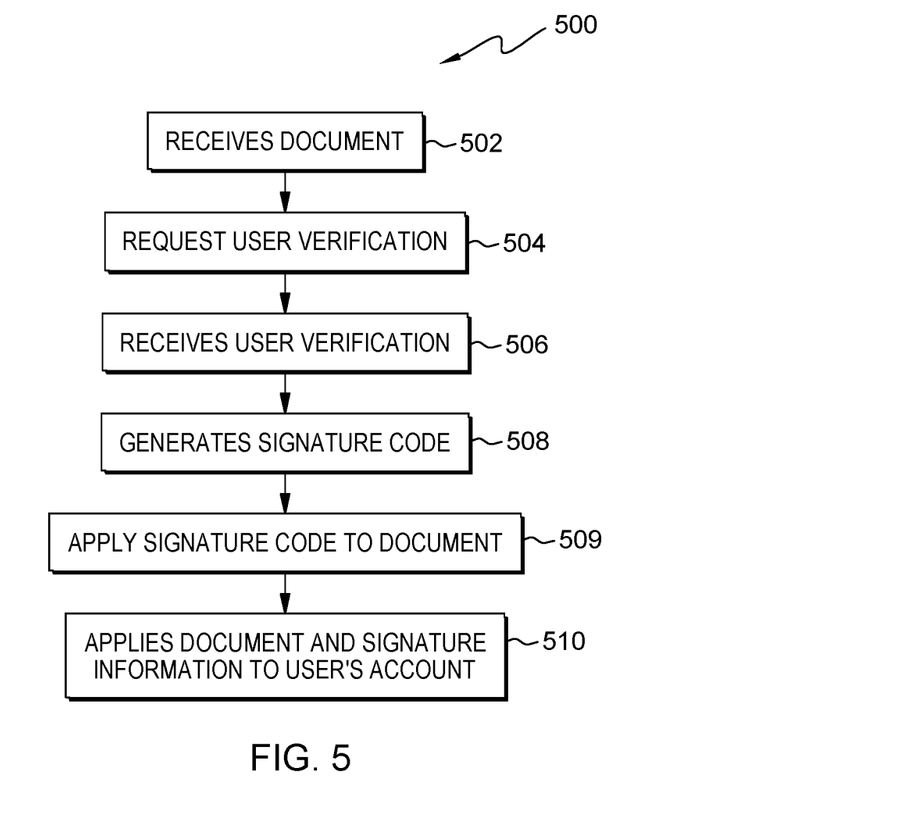
FIG. 5 depicts a flowchart of the operational steps taken by a program within the computing environment of FIG. 1, according to an embodiment of the present invention.

FIG. 5 shows flowchart 200 depicting a method according to the present invention. The method(s) and associated process(es) are now discussed, over the course of the following paragraphs, with extensive reference to FIG. 2, in accordance with one embodiment of the present invention.

In step 502, the verification module 406 receives the document to be signed. The document may be an electronic document, or a hard copy document which is scanned, or an image is taken of the document. The verification module 406 or a third-party software may convert the scanned document or image of the document to an editable version. In some embodiments, the document is uploaded to the database 408 and accessed by verification module 406, or the verification module 406 may be incorporated into the software or system which is used to generate the document (e.g. Adobe®, Word®, etc.).

In some embodiments, the verification module 406 requires the user's assistance to identify the signature or the location in which the signature will be applied to the document. In other embodiments, the verification module 406 analyzed the document to identify the signature or the location in which the signature will be input or embedded within the document.

In some embodiments, the verification module 406, may require alterations to be made to the document and/or the identified signature location. For example, if the signature line is at the bottom of the page, it may be moved to the following page to allow for the additional content to be displayed in close proximity to the signature. If the signature area is of a smaller area than required, the verification module 406 may require an enlarged version of the document.

In step 504, the verification module 406 requests the verification of the user. Once the user has selects to sign the document, the verification module 406 requests the required identification information to verify the user's identity. This may be biometric data, such as, but not limited to, fingerprint, retina scan, voice confirmation, facial scan, or the like which the computing device 410 to capable of accepting or verifying. In some embodiments, the user is presented with the option to select the verification method based on the approved verification methods associated with the user's account.

In some embodiments, the type of identification and the number of different forms of identification may be selected by the user or may be based on the document type. For example, documents which contain certain information (e.g. social security numbers and bank account information) may require more than one biometric verification. In these embodiments, the verification module 406 previously scanned the document to identify the type of information contained in the document and assess a security level of the document. In other examples, the user may require two forms of identification based on personal security preferences and levels.

In step 506, the verification module 406 receives the identification inform requested. The verification module 406 confirms the relationship between the biometric information and the user to verify the user's identity. The verification module 406 accesses the database 408 to confirm the accuracy between the received identification information and the information stored related to the user. If the received identification information meets a predetermined threshold value, the verification module 406 confirms the user's identity.

In some embodiments, where previously collected, the verification module 406 compares the previously collected identifies personnel which are qualified to complete each task. In some embodiments, where the verification module 406 is receiving the information for the first time, a procedure to associate the biometric data to the user accounts is completed. In additional information the biometric data is collected from a third party to confirm the association between the biometric data and the user. In some embodiments, the position or location of the user at the time of verifying is recorded.

Figure 7:
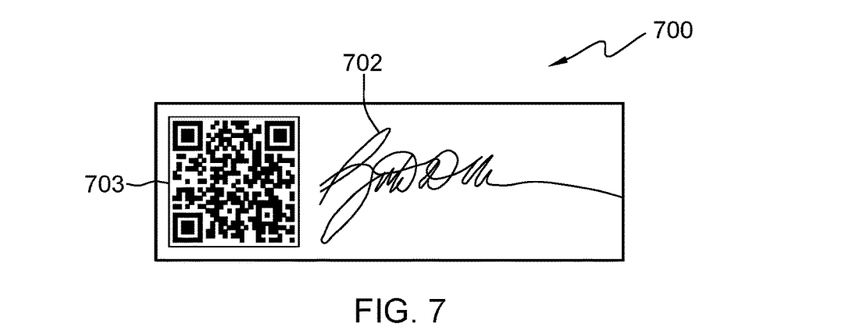
FIG. 7 depicts an illustration of an embodiment of a Coded Signature, according to an embodiment of the present invention.

In step 508, verification module 406 generates the Coded Signature. The Coded Signature, depicted in FIG. 7, is a signature which contains two key components. A first component is the user's personal signature. Historically this signature is specific to the person writing and asserts the user's approval of the content of the document. The signature may be handwritten by the user, may be scanned and attached to the user's account, or may be a generic cursive signature of the user's name. The second portion of the signature is a computer-generated code. In some embodiments, the code is a two-dimensional barcode. The two-dimensional code may be, but not limited to, a QR code, a barcode, linear barcodes, matrix barcodes, or the like. The code is used to encode binary information on surfaces, have information density limits to meet the requirements of the signature type. In some embodiments, the code is encrypted via various types of known encryption methods, for example AES-256. Based on the type of code and the limitations of the data which can be contained in the code, the verification module 406 generates the code to include information which is associated only with the signing of the present document. This information can include, but is not limited to, the time, location (GPS determined by device), specific user account numbers, specific user account signature number, biometric data, biometric verification form data, document file name/number/identification, or the like.

In a first embodiment, the code includes at least two different types of data incorporated into the signature. For example, the types of data, may be, but not limited to, the actual written signature, the biometric confirmation of the signer, the date and/or time the signature was produced, the global position of where the signature was made, the document identification (or file) name, or the like. In some embodiments, more than two types of data are required based on the importance or security requirements of the document/signature. For example, a legal documents or business documents may require more types of data to complete the signature due to the higher degree of security and authenticity of the document. In other embodiments, the types of data and the quantity of data required to generate the signature may be based on the type of computing device and the features of the device. For example, a mobile phone may be able to collect the signature, the biometric data, and the position of the signer, while a desktop computer may only be able to collect the signature, the time the signature was generated, and an image captured from the webcam at the time of signing. The image may be stored on a database and accessed later to verify the identity of the signer.

In step 509, the verification module 406 applies the signature to the document. The verification module 406 may provide the user to manually position the Coded Signature in the document. In other embodiment, the verification module 406 automatically positions the Coded Signature at the ideal location based on the document signature locations and the like. In some embodiments, the verification module 406 adjusts the document so the signature is sized proportionately based on the document resolution and signature location size.

In step 510, the verification module 406 stores the document and the associated information to the user's account. The verification module 406 stores each document signed by the user, each individually generated Coded Signature, and all other associated information related to the document and signature with the user's account. The preservation of the documents provides for the verification process of the signatures when either scanned or contested.

Figure 6:
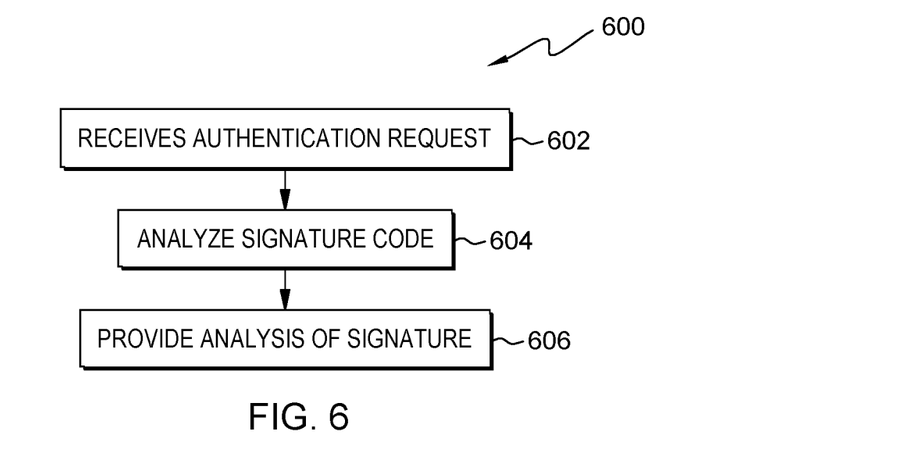
FIG. 6 depicts a flowchart of the operational steps taken by a program within the computing environment of FIG. 1, according to an embodiment of the present invention.

FIG. 6 shows flowchart 600 depicting a method according to the present invention. The method(s) and associated process(es) are now discussed, over the course of the following paragraphs, with extensive reference to FIG. 6, in accordance with one embodiment of the present invention.

In step 602, the authentication module 407 receives a request to review a document based on the Coded Signature. This request may be activated by the user making a formal request through the program 405, through activating the scanning feature of the computing device 410 and capturing the Coded Signature, wherein the authentication module 407 begins the processing of the Coded Signature.

In step 604, the authentication module 407 analyzes the signature. This analysis is performed by extracting the data contained within the Coded Signature, analyzing both the formal written signature and the code. In some embodiments, where an image of captured of the document, the authentication module 407 analyzes the content of the document surrounding the Coded Signature. This information is collected and compared to the stored data associated with the Coded Signature and the user's account. In some embodiments, when a signature is scanned, the authentication module 407 determines the user associated with the account and requests a verification by the user to authenticate the signature. This creates a first level of forgery protection where the user is able to control which documents he allows to be scanned, and to determine if a document is being scanned without his knowledge or consent.

In step 606, the authentication module 407 provides the analysis of the Coded Signature and confirms the accuracy of the signature on the document or determine if the document is a forgery. This analysis may include a copy of the original signed document for the user to compare the signatures to. The issues or complications with the verification process, or the identification of a forgery.

FIG. 7 depicts and illustration 700 of the Coded Signature, according to the present invention. The Coded Signature 700 has the user's actual written signature 702 and a QR code 704 distal to the written signature 702 containing the user specific verification and authentication information and data. The QR code 704 includes is "locked" once applied to the document, and any alterations to the QR code 704 would be incapable of matching up with the original signed document and associated information contained within the user account. For example, if someone attempts to copy the signature to a different document, the QR code 704 would have incorrect information contained within based on the forged document. Additionally, when the QR code 704 is scanned an image of the document associated with the Coded Signature is captured and may be compared to the original document.

Figure 8:
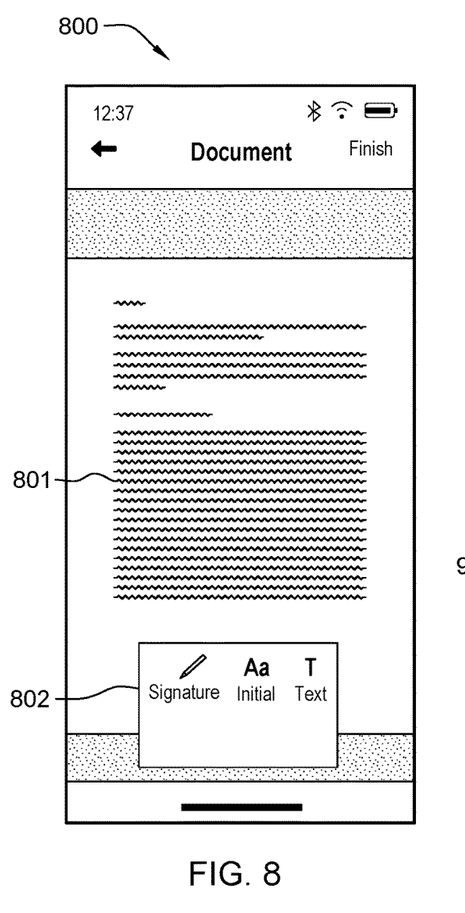
FIG. 8 depicts illustrations of the embedding of a Coded Signature in a document, according to an embodiment of the present invention.
Figure 9:
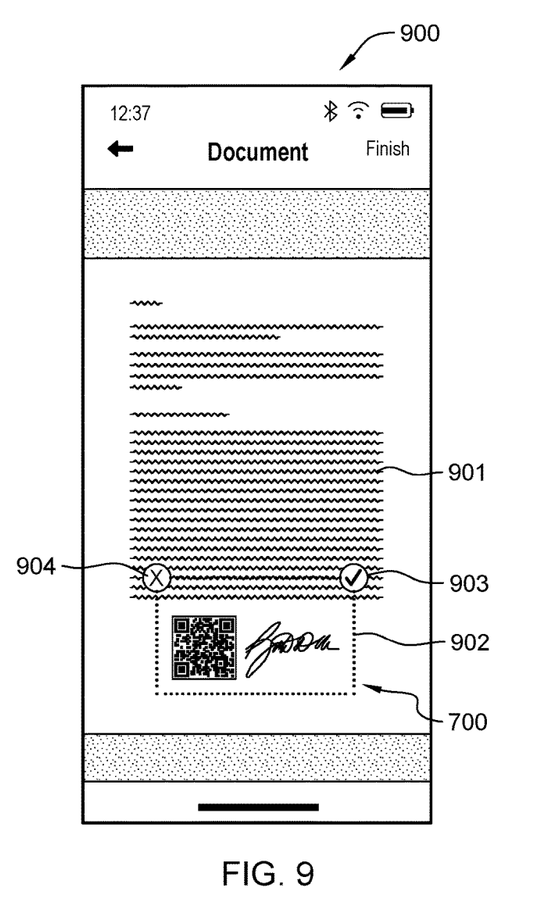
FIG. 9 depicts illustrations of the embedding of a Coded Signature in a document, according to an embodiment of the present invention.

FIGS. 8 and 9 depicts several illustrations showing the application process of the signature on the document. In screen shot 800, the document text 801 is shown with the signature creation window 802 present providing a variety of types of signatures which the user can embed in the document. In screen shot 900 the document text 901 is shown with an exemplary signature 700. The signature 700 is positioned to not obstruct the document text 901. The signature window 902 provides an example of the space taken up by the signature 700. The user has the option to confirm the placement 903 or deleted the signature 904. In some embodiments, the window 902 permits the user to alter or modify the size and position of the signature. In some embodiments, the program(s) set restrictions on the signature size, and position to not interfere with the document text 901 and to create a signature 700 which is readable. From the selection of the document, the user is able to request to apply their signature to the document. The user is then able to select the type of Coded Signature which is to be applied to the to the document. The type may be a simple written signature to a multi-formatted Coded Signature require various types of biometric data. The user is then able to manually determine the location of the document where the signature is applied. The document is then saved, and the user is able to alter the document type (e.g. .pdf, .docx, etc.) and send the document to the recipient.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer implemented method comprising:
receiving, by at least one processor, a request to sign a document;
authenticating, by at least one processor, a user account;
generating, by at least one processor, a coded signature, wherein the coded signature includes a set of data and the set of data is specific to the document and the user account;
embedding, by at least one processor, the coded signature in the document;
creating, by at least one processor, a protected signed document; and
storing, by at least one processor, the coded signature and the protected document with the user account;
capturing, by at least one processor, an image of a requested document, wherein the coded signature is visible; and
requesting, by at least one processor, to authenticate the requested document, wherein the request further comprising, comparing, by at least one processor, the image of the visible coded signature with the coded signature associated with the user account.

2. The computer implemented method of claim 1, wherein the authentication of the user account requires the collection, by at least one processor, of user specific biometric data.

3. The computer implemented method of claim 1, wherein the coded signature is comprised of a user generated signature and an embedded code.

4. The computer implemented method of claim 1, wherein the set of data includes location data, time related data, user biometric related data, and document related data.

5. The computer implemented method of claim 1, wherein a request to authenticate the document, further comprising, identifying, by at least one processor, the user account associated with the captured coded signature.

6. The computer implemented method of claim 1, wherein the embedding of the coded signature in the document is automatically positioned based on the content and format of the document.

7. A computer program product comprising:
one or more non-transitory computer readable storage media and program instructions stored on the one or more computer readable storage media, the program instructions comprising:
program instructions to receive a request to sign a document;
program instructions to authenticate a user account associated with the document, wherein the authentication requires the collection of data associated with the generation of a coded signature;
program instructions to generate the coded signature, wherein the coded signature includes a first set of data and the first set of data is specific to the document and the user account;
program instructions to embed the coded signature in the document; and
program instructions to create a signed document, wherein the signed document is associated with the user account;
program instructions to capture an image of a document, wherein a coded signature is readable in the image;
program instructions to analyze the captured coded signature and identify a user account associated with the coded signature;
program instructions to extract a second set of data associated with the coded signature;
program instructions to compare the first set of data and the second set of data; and
program instructions to verify that the second set of data is substantially identical to the first set of data.

8. The computer program product of claim 7, wherein the coded signature is comprised of a user generated signature and a readable code.

9. The computer program product of claim 7, wherein the collected data includes location data, time data, and user biometric data.

10. The computer program product of claim 7, wherein the embedding of the coded signature in the document further comprising, program instructions to identify a position within the document, wherein the coded signature does not interfere with the document content and the coded signature is readable.

11. A computer system comprising:
a computer non-transitory readable storage device readable by one or more processing circuit and storing instructions for execution by one or more processor for performing a method comprising:
program instructions to receive a request to sign a document;
program instructions to authenticate a user account associated with the document;
program instructions to generate a coded signature, wherein the coded signature includes a first set of data and the first set of data is specific to the document and the user account, and wherein the authentication of the user account requires program instructions to collect data associated with the generation of the coded signature;
program instructions to embed the coded signature in the document;
program instructions to create a signed document, wherein the signed document is associated with the user account;
program instructions to store the signed document with the user account;
program instructions to receive a captured image of the document, wherein a captured coded signature is visible; and
program instructions to authenticate the captured coded signature with the coded signature of the stored document, wherein the user is contacted to confirm the authenticity of the captured coded signature.

12. The system of claim 11, wherein the generation of the coded signature further comprising, program instructions to transfer the user generated signature into a predetermined portion of the coded signature space.

13. The system of claim 11, wherein the generation of the coded signature further comprising, program instructions to create a readable code that contains a set of predetermined data associated with the time, location, and the user, wherein the time, location, and user data is integrated into the readable code.

14. The system of claim 11, wherein a request to authenticate a coded signature is received, program instructions to process the coded signature and contact the user associated with the signature to request approve to authenticate the coded signature.

* * * * *